E. E. ELLIS & S. D. ELY.
WHIP OR CANE MOUNTINGS.

No. 175,954. Patented April 11, 1876.

Witnesses
W. A. Loder.
H. L. Fairchild

Inventors:
Edgar E. Ellis.
Saml. D. Ely,
pr R. F. Osgood
atty.

UNITED STATES PATENT OFFICE.

EDGAR E. ELLIS AND SAMUEL D. ELY, OF ROCHESTER, NEW YORK; SAID ELY ASSIGNOR TO ANNA E. ELLIS, AND SAID ANNA E. AND EDGAR E. ELLIS ASSIGNORS TO STRONG & WOODBURY, OF SAME PLACE.

IMPROVEMENT IN WHIP OR CANE MOUNTINGS.

Specification forming part of Letters Patent No. 175,954, dated April 11, 1876; application filed February 17, 1874.

*To all whom it may concern:*

Be it known that we, EDGAR E. ELLIS and SAMUEL D. ELY, both of the city of Rochester, in the county of Monroe and State of New York, have invented a certain new and useful Improvement in Whip-Caps; and we do hereby declare that the following is a full, clear, and exact description of the construction and operation of the same.

This improvement relates to the caps which are placed upon the ends of whip-handles. Heretofore, so far as we are aware, such caps have been made of braided fabric, horn, metal tube, and in one instance of a composition of gum-shellac molded on a metal thimble. Such devices are objectionable—lacking in strength, or presenting a bad appearance.

Our invention consists, as a new article of manufacture, of a metallic body with an exterior covering of rubber vulcanized thereon, as hereinafter more fully described.

Figure 1:
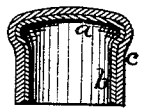
Figure 2:
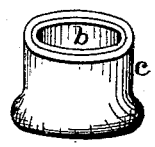

In the drawings, Figure 1 is a section, and Fig. 2 is a perspective view.

*a b* represent the metallic body, which is simply a cap having its base and sides closed and one end open, this end fitting upon the end of the whip-handle. This metallic body may be of any material, but preferably of stiff tin or brass, and formed of one or more pieces. The most convenient way is to stamp or "strike it up," as thereby no seam or projection is made, but it presents a smooth and unbroken surface for the application of the rubber. *c* is the rubber covering. It is laid over the surface of the metal smoothly—at the base as well as the sides—and the edges made close-fitting, and the whole is then subjected to heat in the usual manner, thereby vulcanizing the rubber upon the metal. After the article is formed it may be turned, smoothed, or polished, and when complete it is placed on the end of the whip-handle in the ordinary way.

By the means above described, we produce an article having all the strength of metal, and yet covered by a solid body of rubber, which is capable of a high polish, and presents a fine appearance. The whole is produced at much less expense than horn, while the strength is greatly increased. The metallic base *a* will prevent breakage by the dropping of the whip on its end, which is a common practice, and which is in a short time fatal to all whip-caps of a brittle nature.

We do not claim vulcanizing rubber or metallic surfaces, neither do we claim a metallic thimble having a composition base molded thereon; but

We claim—

As an improved article of manufacture, a whip-cap composed of the metallic body *a b*, with an exterior covering of rubber, *c*, vulcanized thereon, as and for the purpose specified.

In witness whereof we have hereunto signed our names in the presence of two subscribing witnesses.

EDGAR E. ELLIS.
SAMUEL D. ELY.

Witnesses:
R. F. OSGOOD,
E. B. SCOTT.